(12) United States Patent
Kaufmann et al.

(10) Patent No.: US 9,391,545 B2
(45) Date of Patent: Jul. 12, 2016

(54) METHOD AND ELECTRONIC DEVICE FOR IMPROVING THE AVAILABILITY OF AN ELECTROMECHANICAL ACTUATOR

(75) Inventors: Tom Kaufmann, Ippenschied (DE); Peter Stauder, Mainz (DE); Jürgen Böhm, Oberneisen (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 38 days.

(21) Appl. No.: 14/362,494

(22) PCT Filed: Aug. 16, 2012

(86) PCT No.: PCT/EP2012/065988
§ 371 (c)(1),
(2), (4) Date: Sep. 12, 2014

(87) PCT Pub. No.: WO2013/083301
PCT Pub. Date: Jun. 13, 2013

(65) Prior Publication Data
US 2015/0162856 A1 Jun. 11, 2015

(30) Foreign Application Priority Data
Dec. 7, 2011 (DE) .......................... 10 2011 087 907

(51) Int. Cl.
*H02P 6/00* (2006.01)
*B60T 8/88* (2006.01)
*B60T 13/74* (2006.01)

(52) U.S. Cl.
CPC ................. *H02P 6/002* (2013.01); *B60T 8/885* (2013.01); *B60T 13/741* (2013.01); *H02P 6/001* (2013.01); *B60T 2270/402* (2013.01); *B60T 2270/404* (2013.01); *B60T 2270/82* (2013.01)

(58) Field of Classification Search
CPC ........................................................ H02P 6/002
USPC ................................. 318/400.01, 400.09, 700
See application file for complete search history.

(56) References Cited

U.S. PATENT DOCUMENTS

| 6,157,887 A | * | 12/2000 | Zittlau | ..................... | B60T 7/042 303/122.03 |
| 8,348,352 B2 | * | 1/2013 | Nishino | ................... | B60T 7/042 303/115.2 |
| 8,562,080 B2 | * | 10/2013 | Sekiguchi | ............... | B60T 8/442 303/12 |

FOREIGN PATENT DOCUMENTS

DE 10 2005 036 827 A1 2/2007
DE 10 2007 021 286 A1 11/2008
(Continued)

OTHER PUBLICATIONS

PCT International Search Report—Oct. 26, 2012.
(Continued)

*Primary Examiner* — David S Luo
(74) *Attorney, Agent, or Firm* — Brinks Gilson & Lione

(57) ABSTRACT

A method for improving the availability of an electromechanical actuator of an electromechanical or electrohydraulic brake system in a motor vehicle, including electronic motor regulation functioning in a non-restricted operating mode (normal operation) for a field-commutated electric motor actuated by pulse width modulation. An electronic device having a setpoint value interface (1) for presetting setpoint variables and parameters, a module for calculating pulse width modulation switching times (4), a module for dead time compensation (5), a power electronics module (6) for actuating an electric motor (7) actuated on three phases, including a module for setpoint current determination (2) which is electrically connected to the field-oriented current controller (3) and receives, via this connection, setpoint current values (Id_set, Iq_set) calculated using various state and/or estimated variables and stored parameters from the module for setpoint current determination.

19 Claims, 2 Drawing Sheets

(56) References Cited

FOREIGN PATENT DOCUMENTS

| DE | 10 2008 024 180 A1 | 12/2008 |
| DE | 10 2009 046 234 A1 | 5/2011 |
| EP | 1 026 060 A2 | 8/2000 |
| WO | WO 2007/090718 A1 | 8/2007 |

OTHER PUBLICATIONS

German Examination Report—Apr. 22, 2013.

* cited by examiner

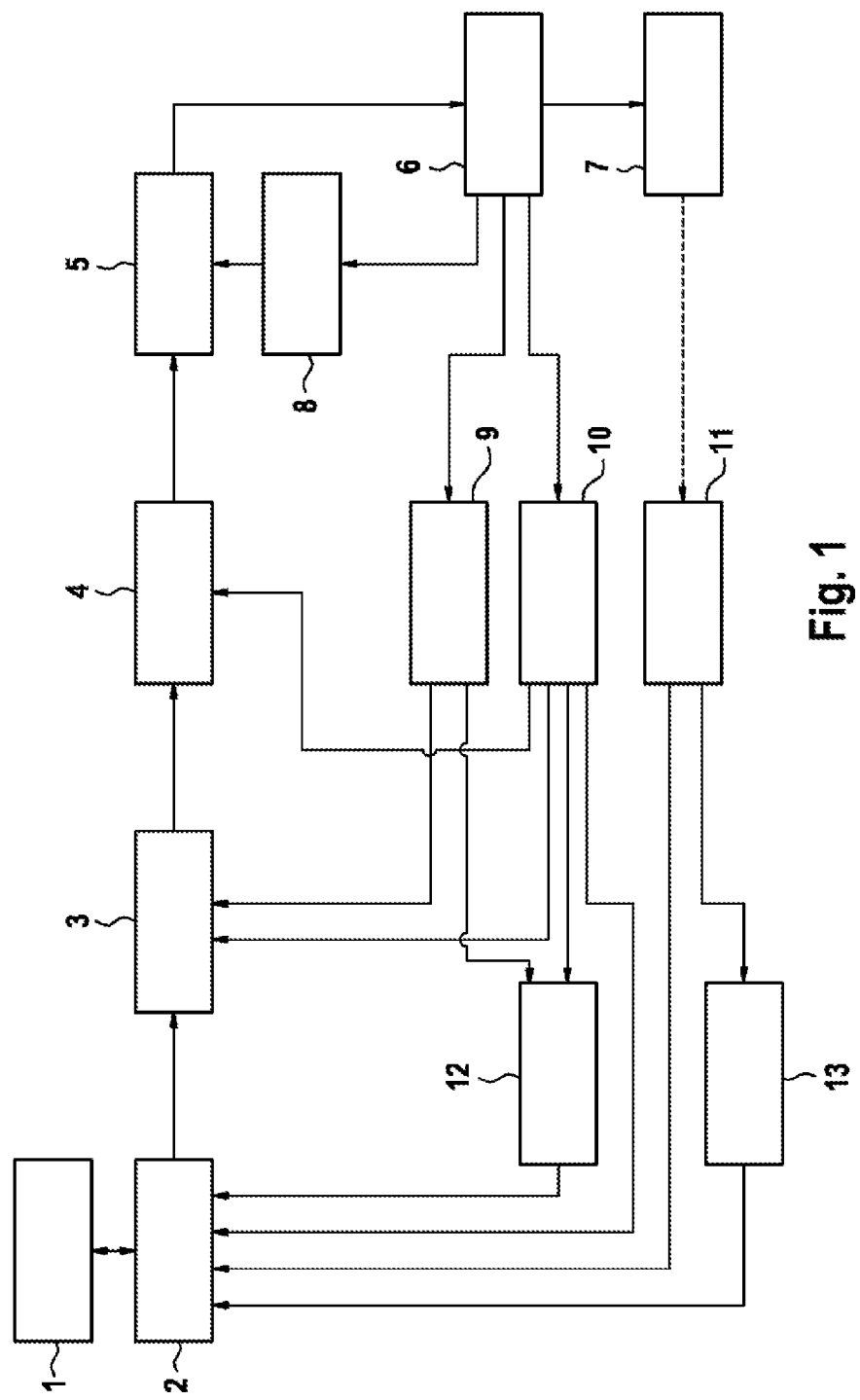

|  | U, T and $t_{PWM}$ measurement active | U measurement failed | T measurement failed | $t_{PWM}$ measurement failed |
|---|---|---|---|---|
| Current measurement active | Normal operation: largely unrestricted functionality of all components of the motor regulation | Normal operation: - vehicle electrical distribution system measures switched off - voltage-dependent reduction in the PWM modulation degree switched off | Normal operation: - temperature monitoring deactivated | Normal operation: - dead time compensation depending on current zero crossing |
| Current measurement failed in one phase | First release level: - reduction in the modulation degree of the PWM, with the result that two currents are always measurable | First release level: - vehicle electrical distribution system measures switched off - voltage-dependent reduction in the PWM modulation degree switched off | First release level: - temperature monitoring deactivated | First release level: - dead time compensation depending on current zero crossing |
| Current measurement completely failed | Second release level: - model-assisted determination of the current components id and iq - vehicle electrical distribution system measures active - temperature monitoring active (possibly modified) - dead time compensation active | Third release level: - voltage-controlled operation - vehicle electrical distribution system measures switched off - voltage-dependent reduction in the PWM modulation degree switched off | Third release level: - voltage-controlled operation - possible vehicle electrical distribution system measures switched off - temperature monitoring deactivated | Third release level: - voltage-controlled operation - possible vehicle electrical distribution system measures switched off - dead time compensation deactivated |

Fig. 2

METHOD AND ELECTRONIC DEVICE FOR IMPROVING THE AVAILABILITY OF AN ELECTROMECHANICAL ACTUATOR

CROSS REFERENCE TO RELATED APPLICATIONS

This application claims priority to German Patent Application No. 10 2011 087 907.2, filed on Dec. 7, 2011; and PCT/EP2012/065988, filed Aug. 16, 2012.

FIELD OF THE INVENTION

The present invention relates to a method for improving the availability of an electromechanical actuator of an electromechanical brake system (EMB) in a motor vehicle and to an electronic device.

BACKGROUND

In motor vehicle engineering, "brake-by-wire" brake systems are becoming increasingly widespread. Such brake systems often includes electromechanical actuators which are each assigned to a wheel and are actuated by electronic signals which can be triggered by a braking desire of the vehicle driver or, for example, by an electronic stability program. The braking effect is in particular achieved by means of a friction brake. An actuator includes, in electromechanical brake systems, at least one electric motor, a transmission and a friction brake, wherein the desired application force is applied to the brake disks by the electric motor. In the case of electrohydraulic brake systems, the required hydraulic pressure can be made available by a central actuator, for example.

DE 102 007 021 286 A1 discloses an electromechanical brake system with a failsafe energy supply and a method for the failsafe supply of energy in an electromechanical brake system for vehicles. The brake system includes up to four brake modules, each assigned to a wheel, wherein each brake module includes a control device and an actuator, to which energy is supplied by a main energy supply unit via separate lines. Furthermore, the provision of a first and a second emergency energy supply unit with supply for in each case two of the brake modules with lines routed separately from one another is disclosed. In the application, no mention is made of how the functionality of the brake system can be maintained in the event of faults within the regulation of the electric motor of the actuator.

The object of the present invention consists in providing a method for improving the availability of an electromechanical actuator and a corresponding electronic device which function more reliably, i.e. which maintains the operation of the motor regulation and therefore of the actuator in particular in the event of the occurrence of a fault or a failure of the detection of individual or a plurality of state variables of the regulation of the electric motor of an actuator of an electromechanical or electrohydraulic brake system.

This object is achieved according to the invention by the method and the electronic device described herein.

SUMMARY AND INTRODUCTORY DESCRIPTION OF THE INVENTION

The method according to the invention for improving the availability of an electromechanical actuator of an electromechanical or electrohydraulic brake system in a motor vehicle, said method includes electronic motor regulation functioning in a non-restricted operating mode (normal operation) for a field-commutated electric motor actuated by pulse width modulation, is characterized in that in addition to the non-restricted operating mode, further operating modes are defined for the motor regulation, which operating modes function with restricted access to state variables of the electric motor and the actuation electronics thereof, wherein a change in the regulation sequence and/or switching-off of individual functions of the motor regulation depending on the restricted access or the restricted accesses is/are implemented in said further operating modes.

With the definition of the operating modes, it is possible to maintain the regulation of the electric motor in cases of restricted access to the state variables and to avoid a complete failure of the electric motor or switchover to a mechanical release level of the actuator in fault cases of this type.

In accordance with one development of the method according to the invention, the operating modes of the motor regulation are ordered hierarchically corresponding to defined power degradation stages (release levels) of the electromechanical actuator. These operating modes are preferably and expediently directed to the safety of the vehicle occupants. The functionality of the electromechanical or electrohydraulic brake system is thus maintained in the event of a possible reduced output power of the actuator. The need for the use of a mechanical release level is thus notably reduced and the safety of the vehicle occupants in the event of faults is markedly increased in comparison with the prior art.

In accordance with a further preferred embodiment of the method according to the invention, actuation and regulation of the electric motor takes place such that a largely consistently high output power is achieved over as wide a rotation speed range of a rotor of the electric motor as possible (constant power operation). Thus, firstly a constant braking effect is achieved, and secondly a maximum permissible electric power is drawn over this rotation speed range. This is advantageous in particular for the actuators of an EMB since said actuators can in some situations subject a vehicle electrical distribution system of the motor vehicle to a severe load owing to a high current requirement.

In accordance with a further preferred embodiment of the method according to the invention, switching-off of vehicle electrical distribution system protection measures and/or temperature monitoring and/or dead time compensation can be implemented depending on the respective operating mode. Particularly preferably this takes place when state variables required for the normal operation are no longer available. In particular the state variable which is missing or is disrupted owing to the restricted access can thus be identified and the operating mode selected which, without this state variable, maintains the functionality of the regulation of the electric motor, wherein the fixing of the respective operating mode is preferably dependent on the restricted or unrestricted access to temperatures and/or intermediate circuit voltage and/or switching times of the pulse width modulation of the electric motor and the actuation electronics thereof.

The fixing of the respective operating mode is preferably dependent on the access to measurement results of the currents in the phases of the electric motor, wherein a distinction is at least drawn between one or more of the classes "current measurement functional", "current measurement failed in one phase" and "current measurement completely failed". This main dependency on the measurement results of the currents results from the definition of the power degradation stages (release levels) of the electromechanical actuator.

In the case of restricted access to measurement results of a current in a phase of the electric motor, a reconstruction of this value is preferably performed using the measured current values of the other phases. This relationship can then no longer be evaluated for monitoring the fault currents, however, since it is not possible for fault current identification to be performed on the same basis owing to the calculation of the missing current value.

A reduction in a modulation degree of the pulse width modulation for the actuation of the electric motor is preferably performed when the current measurement takes place at in each case one transistor of the phase of the actuation electronics. This has the advantage that, at any point in time, both remaining current measurement devices can provide a measured value in order that a reconstruction of the missing current value can be implemented.

Preferably, in the case of complete restriction of the access to the measurement results of all of the currents in the phases of the electric motor, a model-based determination of actual current values takes place. Thus, advantageously the field-oriented control of the electric motor can be maintained. A method for the model-based determination of these variables is described in WO 2007/090718 A1, for example.

In accordance with one development of the method according to the invention, in the case of restricted access to the current measurement at a transistor of the phase of the actuation electronics, the determination of the actual current values is performed in model-based fashion, in particular when a reduction in the modulation degree of the pulse width modulation of the electric motor cannot be performed. This takes place, for example, if there is a driving situation in which a resultant reduction in the output power of the electric motor would put the safety of the vehicle occupants at risk.

Preferably, in those types of operation of a non-mechanical release level of the actuator in which, in addition to the access to measurement results of the currents in the phases of the electric motor, the access to at least one further state variable is restricted, the motor regulation switches over from a current-regulated operating mode to a voltage-commutated operating mode.

In accordance with a preferred embodiment, a rotation speed controller overlaid on the current controller is adapted in the voltage-commutated operating state such that setpoint motor voltages are generated, whereby a controlled functionality of the electric motor is maintained. If a model-based determination of the actual currents or a voltage-commutated operating mode is implemented, modules which evaluate motor torque information are preferably deactivated for this purpose, adapted to the use of an equivalent signal and/or switched over to a mode which is matched to a greater faulty motor torque.

The electronic device according to the invention, in particular for improving the availability of an electromechanical actuator of an electromechanical or electrohydraulic brake system in a motor vehicle, said electronic device includes a setpoint value interface for presetting setpoint variables and parameters, a module for calculating pulse width modulation switching times, a module for dead time compensation, a power electronics module for actuating an electric motor actuated on three phases, a module for measuring the pulse width modulation switching times, a module for current detection, a module for voltage measurement, a module for temperature detection, a module for temperature monitoring, a field-oriented current controller, and electrical connecting lines between the component parts, is characterized in that a module for setpoint current determination is provided which is electrically connected to the field-oriented current controller and receives, via this connection, setpoint current values calculated using various state and/or estimated variables and stored parameters from the module for setpoint current determination.

The advantage consists in that it is thus possible to maintain the regulation of the electric motor in cases of restricted access to the state variables of the electric motor and the actuation electronics thereof and to avoid a complete failure of the electric motor or switchover to a mechanical release level of the actuator in the event of faults of this type.

In accordance with a preferred embodiment of the electronic device according to the invention, said electronic device comprises includes an algorithm which is configured in such a way that the electronic device can execute the method according to the invention for improving the availability of an electromechanical actuator.

The electric motor actuated on three phases which, in accordance with a preferred embodiment of the electronic device, is a permanent magnet synchronous motor which in particular has a brushless design, is used for the application of the application force by the actuator. The advantage consists in that this type of motor is particularly suitable for use in a motor vehicle, for example owing to the fact that no maintenance is required and owing to the high dynamic response of the control system, wherein preferably a field-oriented current controller is used for actuating the synchronous motor, with which field-oriented current controller the synchronous motor can be operated above a natural voltage limit (field weakening).

Preferably, a vehicle electrical distribution system measures module is provided which is electrically connected to the module for setpoint current determination, and the maximum values for limiting the drawn and/or output vehicle electrical distribution system current are transmitted via this connection. For example, a limitation of the power drawn by the actuator can thus be implemented in order to protect the vehicle electrical distribution system of the motor vehicle.

In accordance with a development of the electronic device according to the invention, the module for temperature monitoring is connected to the module for setpoint current determination, and the maximum values for limiting the motor-side current are transmitted via this connection. The advantage consists in that damage to the electric motor and the power electronics owing to excessively high temperatures as a result of excessively high currents can be prevented by regulated adjustment of the motor currents.

In accordance with a preferred embodiment, the module for voltage measurement is connected to the vehicle electrical distribution system measures module, and measured voltage values, in particular of the intermediate circuit voltage, are transmitted via this connection. Advantageously, these voltage values can be taken into consideration in the determination of the limitation of the drawn and/or output vehicle electrical distribution system current in the vehicle electrical distribution system measures module.

In accordance with a preferred embodiment of the electronic device according to the invention, the setpoint value interface is electrically connected to the module for setpoint current determination, and setpoint variables and/or parameters are transmitted via this connection. As a result, for example, inputs/outputs by/to the ECU can take place during running operation of the regulation in order to adjust the motor regulation to match superordinate controller structures.

In accordance with a preferred embodiment, the module for temperature monitoring is connected to the module for temperature detection, and temperature values formed on the basis of measured values, model calculations and/or a mixture of these are transmitted via this connection. The knowledge of the largely approximated thermal conditions in the synchronous motor is taken into consideration by the motor regulation, for example to the extent that damage and possible failure as a result of excessively high temperature can be prevented and, secondly, the electric motor can be operated at the thermal power limit.

In accordance with a preferred embodiment of the electronic device, a module for dead time compensation is connected to a module for measuring pulse width modulation switching times at the power electronics (output stage) of the synchronous motor, which module receives the measured values of the pulse width modulation switching times via this connection. As a result, for example, the faults in respect of the output voltage of the power electronics which are brought about by the dead times and switching times of the power electronics can be compensated for.

In accordance with a development of the electronic device, modules for temperature detection, voltage measurement and/or current detection are connected to the power electronics and/or the electric motor electrically or with respect to temperature detection in order to detect these state variables of the synchronous motor and to supply them to the motor regulation.

Preferably, the module for temperature detection is electrically connected to the module for setpoint current determination, and the present temperature values of the power electronics and/or of the synchronous motor are transmitted via this connection. In the case of restriction of the access to the temperature values, advantageously the regulation can be implemented in an operating mode which is different than the normal operation.

BRIEF DESCRIPTION OF THE DRAWINGS

Further preferred embodiments result from the dependent claims and the description below relating to an exemplary embodiment with reference to figures.

In the figures:

FIG. 1 shows a schematic block circuit diagram of the electronic device according to the invention, and FIG. 2 shows a tabular overview of possible operating modes of the motor regulation.

FURTHER DESCRIPTION OF THE INVENTION

FIG. 1 shows the signal flow of the variables under consideration in a block circuit diagram, which is reduced to the most necessary variables for the description of the electronic device and the method, of a motor regulation of a field-commutated permanent magnet synchronous motor (PMSM) of an actuator of an electromechanically driven power-assisted brake system (CFB). This type of motor is particularly suitable for use in a motor vehicle since, for example owing to the lack of commutators, the maintenance intensity involved is reduced in comparison with synchronous motors having commutators. The rotation speed of the rotor of the PMSM and the motor position are assumed to be ensured and are therefore not illustrated.

During normal operation, a setpoint current value idset and a setpoint current value iqset are formed, depending on a module for setpoint current determination 2, from the setpoint values incoming via a setpoint value interface 1 and further measured and estimated variables as well as stored parameters. In this explanatory example, temperature, maximum value for the motor-side current, an intermediate circuit voltage and maximum values for the limitation of the drawn/output vehicle electrical distribution system current are included in the calculation of the setpoint current values idset and iqset. Further details will be given below in respect of the determination thereof.

The setpoint current values idset and iqset are supplied to a field-oriented current controller 3 (FOC current controller) which, using actual current values id and iq and the intermediate circuit voltage Uzk, calculates setpoint voltage values and passes said values on to the module for calculating the pulse width modulation (PWM) switching times 4. These are then supplied to a module for dead time compensation 5 and manipulated such that distortions in respect of an output voltage which can be brought about by dead times and switching times of power electronics 6 for actuation of the electric motor 7 are compensated for. For this purpose, the actual PWM switching time tPWMact measured with the aid of a module for measuring the PWM switching times 8 at the power electronics 6 can be taken into consideration in the module for dead time compensation 5.

Detection of the phase currents takes place at the power electronics 6, from which the actual current values id and iq are determined by a module for current detection 9, and a voltage measurement 10, in particular for detecting the intermediate circuit voltage Uzk, takes place. The actual currents are formed by the current detection 9 on the basis of measured values and supplied to the current controller 3 and a vehicle electrical distribution system measures module 12. The value of the intermediate circuit voltage Uzk is made available to the module for setpoint current determination 2, the current controller 3, the module for calculating the pulse width modulation (PWM) switching times 4 and the vehicle electrical distribution system measures module 12. In the vehicle electrical distribution system measures module 12, the maximum values for limiting the drawn and/or output current on the vehicle electrical distribution system side are determined and transmitted to the module for setpoint current determination 2.

At least one temperature signal T is formed by a temperature detection 11 at the electric motor 7 and supplied to the module for setpoint current determination 2. In addition, the maximum value for the motor-side current is determined by temperature monitoring 13 with the aid of the temperature signal T or the temperature signals, and this maximum value is likewise communicated to the module for setpoint current determination 2. The determination of the maximum value for the motor-side current by the temperature monitoring 13 can in this case be based on measured values, model calculations or a mixture of the two.

FIG. 2 shows a tabular overview of possible operating modes of the motor regulation and the resultant power degradation stages of the electromechanical actuator, wherein said operating modes are directed to the availability of the phase current measurement. For the first release level, in the case of the restricted access to a current signal, a three-phase current measurement is assumed.

Since further state variables are required for comprehensive motor regulation and for determining equivalent signals, details are given in columns 3 to 5 of the tabular overview in FIG. 2 of the effects on the motor regulation in the case of restricted access to these measurement signals (temperature, intermediate circuit voltage and measured PWM switching times in the motor phases). The availability of a rotor position information is presupposed for the exemplary embodiment.

The vehicle electrical distribution system measures module 12, the temperature monitoring module 13 and the dead time compensation module 5 can be deactivated independently of one another if in each case the required input signals are no longer available.

If, in the case of three measured phase currents, one of the current measurement signals fails, it is possible to switch to an operating mode different than the normal operation, in accordance with the table in FIG. 2, row 3, column 2, which operating mode is in a first release level of the power degradation stages. The missing current value can then be reconstructed by calculation with the assumption that the sum of the currents is equal to zero. This relationship can then no longer be evaluated for monitoring fault currents, however.

If the measurement of the currents does not take place directly in the phase but at in each case one transistor of the phase (for example low-side shunt), the modulation degree of the PWM needs to be selected such that the two remaining current measuring devices can provide a measured value at any point in time. In this case, a voltage utilization of 100% is no longer possible, as a result of which the output power of the motor is reduced. If the resultant reduction in the actuator power is not possible owing to the safety of the vehicle occupants which needs to be ensured in a present driving situation, a model-based method for determining the currents is used and the actuation of the motor is continued with maximum modulation.

If there are restrictions to the accesses to all of the current measurements, the system is switched over to a further operating mode, wherein the system is changed over to a second release level of the power degradation stages of the actuator regulation (FIG. 2, row 4, column 2). The actual current values id and iq are determined with the aid of a model-based method in the module for current detection 9 by calculation and supplied to the current controller 3. A disadvantageous effect on the system response may be that the errors in the case of the model-based estimation of the currents also result in a greater error, in comparison with normal operation, in the determination of the output motor torque. For this reason, modules which evaluate motor torque information under some circumstances need to switch over to a mode which is matched to a motor torque which is subject to a greater error. This may be of importance for torque injections or error identification modules, for example.

The method used for the model-based calculation of the currents id and iq requires the consideration of further state variables. At least the intermediate circuit voltage Uzk and the temperatures of the electric motor and power electronics need to be known. Furthermore, it is necessary to ensure that the dead time compensation is active and discrepancies between an output voltage of the power electronics and the predetermined setpoint values are prevented.

If, in addition to the current measurement, there are restrictions in the case of access to a further state variable, the system is switched over to an operating mode of a third release level (FIG. 2, row 4, columns 3-5). In this type of operation, the electric motor is still only voltage-commutated, i.e. the current controller is deactivated and, depending on the measured rotor position, a motor setpoint voltage is determined and output.

In order to determine the motor setpoint voltage, in addition to the measured rotor position angle, if there is unrestricted access, it is also possible to use the rotation speed of the rotor and the motor temperature. A rotation speed controller overlaid on the current controller is adapted in this operating state such that motor setpoint voltages are generated. All further modules which process the information on the output motor torque are deactivated or are set to the use of an equivalent signal. An equivalent signal for the output motor torque can be formed in a module which evaluates existing state variables. On the basis of the torque information thus obtained, it is possible to implement rudimentary measures for the protection of the vehicle electrical distribution system. Since these measures could further reduce the availability of the system under certain circumstances, however, this should be dispensed with or a check should be performed during system design to ascertain to what extent these measures are applicable.

The further cells in the tabular overview in FIG. 2 describe the measures within the respective operating modes of the release levels of the power degradation stages, depending on the availability of the state variables (temperatures, intermediate circuit voltage and measured pulse width modulation switching times in the motor phases).

One advantage of the invention consists in the improvement in the availability of an electromechanical actuator of an electromechanical or electrohydraulic brake system, which improvement is directed to achieving safety for vehicle occupants, in the case of restrictions to accesses to state variables of an electric motor used for generating the application force of a friction brake.

While the above description constitutes the preferred embodiment of the present invention, it will be appreciated that the invention is susceptible to modification, variation and change without departing from the proper scope and fair meaning of the accompanying claims.

The invention claimed is:

1. A method for improving the availability of an electromechanical actuator of an electromechanical or electrohydraulic brake system in a motor vehicle, comprising the steps of:
   providing electronic motor regulation functioning in a non-restricted operating mode for a field-commutated electric motor actuated by pulse width modulation and having at least one further operating mode defined for the motor regulation, which further operating mode functions with restricted access to state variables of the electric motor and the actuation electronics thereof, and
   implementing a change in the regulation sequence or a switching-off of individual functions of the motor regulation depending on operating in the further operating mode.

2. The method as claimed in claim 1, further comprising ordering the non-restricted and the further operating mode of the motor regulation hierarchically corresponding to defined power degradation stages of the electromechanical actuator.

3. The method as claimed in claim 2 further comprising in that, in types of operation of a non-mechanical release level of the actuator in which, in addition to a restricted access to the measurement results of the currents in the phases of the electric motor, the access to at least one further state variable is restricted, switching regulation of the motor from a current-regulated operating mode to a voltage-commutated operating mode.

4. The method as claimed in claim 1 further comprising implementing a switching-off of a vehicle electrical distribution system protection measure or a temperature monitoring or a dead time compensation depending on operating in the non-restricted or the further operating mode.

5. The method as claimed in claim 1 further comprising a fixing of one of the non-restricted or the further operating mode is dependent on the access to measurement results of the currents in the phases of the electric motor, and drawing a distinction between one or more of the classes of current measurement functional, current measurement failed in one phase and current measurement completely failed.

6. The method as claimed in claim 5 further comprising in that, in the case of a restricted access to measurement results of a current in a phase of the electric motor, performing a reconstruction of a value using measured current values of the other phases.

7. The method as claimed in claim 6, further comprising preforming a reduction in a modulation degree of the pulse width modulation for the actuation of the electric motor when the current measurement takes place for a transistor of the phase of the actuation electronics.

8. The method as claimed in claim 7 further comprising in that, in the case of restricted access to the current measurement at a transistor of the phase of the actuation electronics, determining the actual current values in model-based fashion, when a reduction in the modulation degree of the pulse width modulation of the electric motor cannot be performed.

9. The method as claimed in claim 5 further comprising in that, in the case of a restricted access to the measurement results of all of the currents in the phases of the electric motor, a model-based determination of actual current values takes place.

10. The method as claimed in claim 1 further comprising in that a fixing of one of the non-restricted or the further operating mode is dependent on at least one of a restricted or an unrestricted access to temperatures, or an intermediate circuit voltage or a switching time of pulse width modulation of the electric motor, and actuation electronics.

11. The method as claimed in claim 1 further comprising in that, for the non-restricted operating mode, there is largely unrestricted access to the state variables, rotation speed, and motor position of the electric motor.

12. An electronic device comprising:
a setpoint value interface for presetting setpoint variables and parameters, a module for calculating pulse width modulation switching times,
a module for dead time compensation, a power electronics module for actuating an electric motor actuated on three phases, a module for measuring the pulse width modulation switching times,
a module for current detection, a module for voltage measurement, a module for temperature detection, a module for temperature monitoring,
a field-oriented current controller, and electrical connecting lines between the component parts, and a module for setpoint current determination which is electrically connected to a field-oriented current controller and receives, setpoint current values calculated using a state or an estimated variables and stored parameters from the module for setpoint current determination.

13. The electronic device as claimed in claim 12, further comprising the electronic device comprises an algorithm, which is configured such that the electronic device can execute a method for improving the availability of an electromechanical actuator of an electromechanical or electrohydraulic brake system in a motor vehicle, including electronic motor regulation functioning in a non-restricted operating mode for a field-commutated electric motor actuated by pulse width modulation, at least one further operating mode defined for the motor regulation, which operating non-restricted and further modes function with restricted access to state variables of the electric motor and the actuation electronics thereof, wherein a change in the regulation sequence or switching-off of individual functions of the motor regulation depending on the restricted access or the restricted accesses is implemented in the further operating mode.

14. The electronic device as claimed in either of claim 12 further comprising in that the electric motor is a type actuated on three phases and of a permanent magnet synchronous motor type.

15. The electronic device as claimed in at least one of claim 12 further comprising a vehicle electrical distribution system measures module which is electrically connected to the module for setpoint current determination, and the maximum values for limiting the drawn or output vehicle electrical distribution system current are transmitted via the connection.

16. The electronic device as claimed in claim 15 further comprising in that the module for voltage measurement is connected to a vehicle electrical distribution system measures module, and measured voltage values, in the form of an intermediate circuit voltage, are transmitted via the connection.

17. The electronic device as claimed in claim 12 further comprising in that the module for temperature monitoring is connected to the module for setpoint current determination, and maximum values for limiting the motor-side current are transmitted via the connection.

18. The electronic device as claimed in claim 12 further comprising in that the setpoint value interface is electrically connected to the module for setpoint current determination, and setpoint variables or parameters are transmitted via this connection.

19. The electronic device as claimed in claim 12 further comprising in that the module for temperature monitoring is connected to the module for temperature detection, and temperature values formed on the basis of measured values, model calculations or a mixture of these are transmitted via the connection.

* * * * *